United States Patent
Dijken et al.

(10) Patent No.: US 9,746,153 B2
(45) Date of Patent: Aug. 29, 2017

(54) LIGHT EMITTING DIODE MODULE WITH IMPROVED LIGHT CHARACTERISTICS

(71) Applicant: PHILIPS LIGHTING HOLDING B.V., Eindhoven (NL)

(72) Inventors: Durandus Kornelius Dijken, Eindhoven (NL); Jianghong Yu, Best (NL); Hans Kroes, Diepenveen (NL); Renatus Hendricus Maria Sanders, Roermond (NL); Hendrik Johannes Boudewijn Jagt, Eersel (NL); Kamal Asadi, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/774,333

(22) PCT Filed: Mar. 10, 2014

(86) PCT No.: PCT/IB2014/059574
§ 371 (c)(1),
(2) Date: Sep. 10, 2015

(87) PCT Pub. No.: WO2014/141030
PCT Pub. Date: Sep. 18, 2014

(65) Prior Publication Data
US 2016/0025294 A1    Jan. 28, 2016

Related U.S. Application Data

(60) Provisional application No. 61/776,108, filed on Mar. 11, 2013.

(51) Int. Cl.
*F21V 3/04* (2006.01)
*H05B 33/08* (2006.01)
(Continued)

(52) U.S. Cl.
CPC .............. *F21V 3/049* (2013.01); *B29C 59/16* (2013.01); *F21K 9/62* (2016.08); *F21K 9/64* (2016.08);
(Continued)

(58) Field of Classification Search
CPC ... F21V 3/049; F21V 9/16; F21K 9/62; B29C 59/16
See application file for complete search history.

(56) References Cited

U.S. PATENT DOCUMENTS 7,879,258 B2    2/2011    De Graaf et al.
8,324,797 B2    12/2012    Shylo et al.
(Continued)

FOREIGN PATENT DOCUMENTS

CN    2929456 A    8/2007
CN    101402860 A    4/2009
(Continued)

*Primary Examiner* — Anabel Ton

(57) ABSTRACT

The present invention relates to lighting module, wherein a light exit window (12) of the lighting module is engraved such that the output color temperature of said lighting module is tuned. The present invention also relates to a method for tuning an output color temperature of a lighting module, said method comprising providing said lighting module comprising a light exit window (12), and a light source arranged to provide light having an optical path through said light exit window (12), said lighting module having a first output color temperature; and engraving a surface of said light exit window (12) such that the output color temperature of said lighting module is tuned to a second output color temperature.

14 Claims, 4 Drawing Sheets

(51) Int. Cl.
*F21V 9/16* (2006.01)
*B29C 59/16* (2006.01)
*F21K 9/62* (2016.01)
*F21K 9/64* (2016.01)
*B29L 11/00* (2006.01)
*F21Y 115/10* (2016.01)

(52) U.S. Cl.
CPC ........... *F21V 9/16* (2013.01); *H05B 33/0857* (2013.01); *B29L 2011/00* (2013.01); *F21Y 2115/10* (2016.08)

(56) References Cited

U.S. PATENT DOCUMENTS

| | | | |
|---|---|---|---|
| 2007/0258247 | A1 | 11/2007 | Park et al. |
| 2008/0310158 | A1* | 12/2008 | Harbers .................... F21K 9/54 362/240 |
| 2009/0101930 | A1 | 4/2009 | Li |
| 2010/0038840 | A1* | 2/2010 | Watanabe .............. B65H 1/025 271/3.22 |
| 2011/0215701 | A1* | 9/2011 | Tong ......................... F21K 9/00 313/46 |

FOREIGN PATENT DOCUMENTS

| | | | | |
|---|---|---|---|---|
| JP | 0383878 | A | 4/1991 | |
| JP | 11085075 | * | 3/1999 | ............ G06F 13/18 |
| KR | 2010038840 | A | 4/2010 | |

* cited by examiner

|  |  | Measurement run 1 | | Measurement run 2 | | Measurement run 3 | |
|---|---|---|---|---|---|---|---|
| A = no engraving<br>B = 10 % engraving | Unit | A | B | A | B | A | B |
| INPUT | | | | | | | |
| Temperature | °C | 25.12 | 25.12 | 55.06 | 55.06 | 85.06 | 85.05 |
| Voltage | V | 23.05 | 23.14 | 22.65 | 22.71 | 22.31 | 22.35 |
| Current | A | 1.00 | 1.00 | 1.00 | 1.00 | 1.00 | 1.00 |
| Power | W | 23.05 | 23.13 | 22.64 | 22.7 | 22.31 | 22.34 |
| OUTPUT | | | | | | | |
| Lumens [change] | Lm | 1913 | 1933<br>[+1.0 %] | 1803 | 1831<br>[+1.6 %] | 1664 | 1700<br>[+2.2 %] |
| Power [change] | W | 6.30 | 6.36<br>[+1.0 %] | 5.95 | 6.03<br>[+1.3 %] | 5.50 | 5.61<br>[+2.0 %] |
| Efficiency [change] | % | 27.32 | 27.48<br>[+0.6 %] | 26.26 | 26.54<br>[+1.1 %] | 24.67 | 25.11<br>[+1.8 %] |
| Efficacy [change] | lm/W | 83.02 | 83.58<br>[+0.7 %] | 79.64 | 80.65<br>[+1.3 %] | 74.62 | 76.11<br>[+2.0 %] |
| Color temperature [change] | K | 2774 | 2754<br>[-20 K]<br>[-0.7 %] | 2783 | 2763<br>[-20 K]<br>[-0.7 %] | 2799 | 2774<br>[-25 K]<br>[-0.9 %] |
| Photons (not normalized) [change] | - | | | | | 9457 | 9627<br>[+1.8 %] |

FIG. 6

|  |  | Measurement run 1 | | Measurement run 2 | | Measurement run 3 | |
|---|---|---|---|---|---|---|---|
| A = no engraving<br>B = 100 % engraving | Unit | A | B | A | B | A | B |
| INPUT | | | | | | | |
| Temperature | °C | 25.12 | 25.12 | 55.06 | 55.06 | 85.05 | 85.04 |
| Voltage | V | 23.29 | 23.43 | 22.84 | 22.97 | 22.47 | 22.58 |
| Current | A | 1.00 | 1.00 | 1.00 | 1.00 | 1.00 | 1.00 |
| Power | W | 23.28 | 23.42 | 22.84 | 22.96 | 22.46 | 22.57 |
| OUTPUT | | | | | | | |
| Lumens [change] | Lm | 1930 | 1698<br>[-12.0 %] | 1838 | 1614<br>[-12.2 %] | 1710 | 1500<br>[-11.8 %] |
| Power [change] | W | 6.32 | 5.59<br>[-11.6 %] | 6.02 | 5.31<br>[-11.9 %] | 5.62 | 4.95<br>[-11.9 %] |
| Efficiency [change] | % | 27.14 | 23.84<br>[-12.2 %] | 26.38 | 23.14<br>[-12.3 %] | 25.02 | 21.92<br>[-12.4 %] |
| Efficacy [change] | lm/W | 82.91 | 72.5<br>[-12.6 %] | 80.47 | 70.27<br>[-12.6 %] | 76.14 | 66.43<br>[-12.8 %] |
| Color temperature [change] | K | 2791 | 2526<br>[-265 K]<br>[-9.5 %] | 2799 | 2531<br>[-268 K]<br>[-9.6 %] | 2812 | 2538<br>[-274 K]<br>[-9.0 %] |
| Photons (not normalized) [change] | - | | | | | 9663 | 8378<br>[-13.3 %] |

FIG. 7

LIGHT EMITTING DIODE MODULE WITH IMPROVED LIGHT CHARACTERISTICS

CROSS-REFERENCE TO PRIOR APPLICATIONS

This application is the U.S. National Phase application under 35 U.S.C. §371 of International Application No. PCT/IB2014/059574, filed on Mar. 10, 2014, which claims the benefit of U.S. Provisional Patent Application No. 61/776,108, filed on Mar. 11, 2013. These applications are hereby incorporated by reference herein.

FIELD OF THE INVENTION

The present invention relates to the field of lighting devices, and is directed towards an improved lighting module.

BACKGROUND OF THE INVENTION

Lighting may be provided by a great variety of different types of light sources. The light source is typically provided in the form of lighting modules comprising one or more light sources in a housing.

One example of a today well established light source is light emitting diodes (LEDs). LED modules typically comprise one or more LEDs arranged in a housing. The LEDs are typically provided on an LED chip, which may comprise further components. The housing has a light exit window through which the light emitted by the LEDs exits.

The light exit window may be made of a ceramic such as alumina. In order to provide a desired color of the provided light, the light exit window may be coated. Commonly used coatings include phosphor coatings, for providing a e.g. yellow colored light. As an example, one way to achieve white light is to combine an LED chip providing blue light with a phosphor coated light exit window, through which the blue LED light passes. As a result of the combination, a white colored output light is obtained.

It is desirable to achieve a lighting module providing light with predetermined characteristics, such as light color, light diffusion, color temperature, light intensity, color hue, and color value. There are many different approaches to improve the light characteristics. For example, for lighting modules comprising coatings, one problem is that variations in the coatings may have a high impact on the characteristics of the output light. Variations in characteristics such as thickness, uniformity and layer density leads to varying light characteristics. Thus, it may be difficult to control the manufacturing of the lighting module such that the desired light characteristics are obtained. Further, it may be difficult to obtain the same light characteristics for each lighting module in a batch of lighting modules.

Development of improved coatings and improving the control of the coating may alleviate this drawback. For example, U.S. Pat. No. 7,879,258 discloses a phosphor layer for an LED module which improves the light quality and provides for a method of tuning the light-diffusing properties by adjusting the phosphor layer.

This is one example of how a light characteristic may be improved. It is of course desirable to further improve the light characteristics and the control thereof for lighting modules such as LED modules.

SUMMARY OF THE INVENTION

It is an object of the present invention to provide a lighting module with improved light characteristics. It is a particular object of the present invention to improve the control of the color temperature of the light output from the lighting module.

According to a first aspect of the invention, the above mentioned and other objects are achieved by a lighting module comprising a light exit window, a light source arranged to provide light having an optical path through the light exit window; wherein a surface of the light exit window is engraved such that the output color temperature of the lighting module is tuned. Thus, the output color temperature of the lighting module after engraving is different than the output color temperature before engraving. Or, in other words, the engraved light exit window has a color temperature which is different from a color temperature of the light exit window without engraving.

Known techniques comprise examples of how light characteristics of the output light such as light diffusing and light color may be modified by modifying a light source, such as an LED, an light source chip and/or a coating of the lighting module, or by adding further components such as diffusers. It has now surprisingly been realized, by the inventors, that characteristics of the output light may also be modified by modifying the light exit window of the lighting module. In particular, it has been realized that the color temperature of the output light may be tuned by engraving the light exit window. A surface of the light exit window or a sub-surface of the light exit window may be engraved, i.e. on an inner layer within the light exit window.

It has been shown that an engraving of about 10% of a surface or of a sub-surface of the light exit window may provide a tuning downwards of the color temperature of about 20 K.

For LED modules, it has been shown that the color temperature of the output light may be tuned downwards in the range of about 20 K to about 260 K, i.e. where the second color temperature is between 20 K and 260 K lower than the first color temperature. The extent of tuning depends on how much of the light exit window is engraved. In measurement runs, where a surface of the light exit window was engraved, a tuning downwards of 20 K was achieved when engraving 10% of the total surface area of the light exit window, and a tuning downwards of 260 K was achieved when engraving 100% of the total surface area of the light exit window. These tuning values correspond to 0.7-9.6% of the measured first color temperature of the LED module, depending on how much of the total surface area of the light exit window that is engraved.

Moreover, it has been shown that there is no significant light output loss for a lighting device in the form of a LED module with an engraved light exit window, in relation to a LED module without any engraving.

In another embodiment the color temperature of the lighting module may be increased by controlling or tuning the amount of scatter or reflection, for example with a laser engraved pattern. In this case, the light exit window has predefined scattering properties. For example, if the light exit window is a ceramic layer, a modification of the porosity of the light exit window provides for a modification of the scattering properties. An increase of the porosity of the light exit window will lead to increased scattering, and this provides for an increase of light that is scattered back to the, in this case, phosphor coating, resulting in a warmer color. A reduction of the amount of scattering will thus give a cooler color, i.e. a higher color temperature. Alternatively, the light exit window may comprise a diffusing or partially reflecting layer which is applied on top of the light exit window. Removal of at least a part of this layer in a controlled way, by means of e.g. engraving, such as laser engraving, leads to an increase of the color temperature.

The surface may be an outer surface, in view of the optical path or facing the light source, of the light exit window. Thus, the lighting module does not need to be de-assembled before the engraving and re-assembled thereafter.

The light exit window may comprise a coating. The coating may be a phosphor coating. The coating may be arranged on an inner surface, in view of the optical path or, in other words, facing the light source, of the light exit window. By arranging the coating on the inner surface, or anywhere inside the lighting module, the coating is protected from being damaged during engraving.

The light exit window may be made of a fully or partly transparent, translucent or fluorescent material. In particular, the light exit window may comprise a material chosen from the group consisting of a glass material, a translucent polymer material such as PMMA, a ceramic material such as alumina, aluminum oxynitrid (AlON), a ceramic phosphor such as Yttrium Aluminum Garnet (YAG) or Lutetium Aluminum Garnet (LuAG), a mineral based material such as sapphire or Spinel, and a fluorescent ceramic such as Cerium doped Yttrium Aluminum Garnet (YAG:Ce) or Cerium doped Lutetium Aluminum Garnet (LuAG:Ce).

The engraving may be performed on a surface of the light exit window. Preferably, the engraving is performed on a surface area of 10-100% of the total surface.

Alternatively, or additionally, the engraving may be performed on a sub-surface of the light exit window, i.e. on an inner layer within the light exit window. The engraving is thus arranged within the light exit window. A sub-surface engraving may be achieved by means of laser engraving.

The lighting module may comprise a cover arranged adjacent to the surface. The cover may protect the engraving and any visual pattern, being for example injection moulded, from e.g. dust or physical damage.

According to a second aspect of the invention, this and other objects are achieved by a method for tuning an output color temperature of a lighting module, the method comprising: providing the lighting module comprising a light exit window, and a light source arranged to provide light having an optical path through the light exit window, the lighting module having a first output color temperature; and engraving the light exit window such that the output color temperature of the lighting module is tuned to a second output color temperature.

The method may further comprise assembling the lighting module, wherein the assembling is performed before the engraving. Thus, the tuning of the LED module may be performed as a separated step to assembling of the LED module.

The engraving may be performed on an outer surface of the light exit window. By this feature, the lighting module does not need to be de-assembled before the engraving and re-assembled afterwards.

Alternatively, the engraving may be performed on a sub-surface of the light exit window. By using sub-surface engraving, such as sub-surface laser engraving (SSLE), the lighting module does not need to be de-assembled before the engraving and re-assembled afterwards.

The method may further comprise measuring the first output color temperature. The measurement may be performed by means of an integrating sphere. The engraving may be performed based on the measured first output color temperature. Thus, the color temperature may be tuned to a predetermined value. For example, each lighting module in a batch of lighting modules may be tuned to a fixed target color temperature.

The engraving may be performed such that a visual pattern is engraved. The visual pattern may comprise an informative text or comprise a logotype or trademark of e.g. the manufacturer. By that, the visual pattern, such as a logotype, is engraved, the amount of output light is not substantially affected in relation to conventional methods for adding a visual pattern, such as printing or adding paint. Such conventional methods produce patterns which block the light from exiting the lighting module. A conventional visual pattern should not cover more than 10% of the light exit window surface area in order to keep the light output level to an acceptable level. For a light bulb, a visual pattern may be achieved on such a low surface area. For smaller modules, such as LED modules, a visual pattern in the form of a logotype would not be readable for a user if it is only allowed to cover up to 10% of the surface area. An engraved visual pattern, according to the present invention, may cover up to 100% of the surface, or sub-surface, of the light exit window without a substantial decrease of the amount of output light. Thus, a visual pattern may be made readable also on small lighting modules such as LED modules.

The engraving may be chosen based on the form of a coating in the lighting module. For example, if the coating comprises a plurality of areas having different conversion characteristics, the engraving may have different tuning effect. Light is backscattered by the engraving to different areas of the coating depending on the position of the engraving. Thus, the position of the engraving may be arranged based on the desired tuning effect.

Alternatively, or additionally, the position of the engraving may be chosen depending on the positions of the light source of the lighting module. It has been shown that engraving at a position of the light exit window corresponding to right above a LED may have more impact on the tuning of color temperature than engraving at a position not corresponding to right above the LED, e.g. at a position corresponding to in between two LEDs.

The light exit window may be injection moulded. Such a light exit window may comprise an injection moulded pattern, such as a logotype or an informative text. The injection moulded pattern may be negative or positive. The engraving of the light exit window may be performed in the injection moulded pattern.

The above disclosed features of the first aspect is also applicable to this second aspect. Moreover, the above disclosed features of the second aspect is also applicable to the first aspect.

It is noted that the invention relates to all possible combinations of features recited in the claims.

BRIEF DESCRIPTION OF THE DRAWINGS

This and other aspects of the present invention will now be described in more detail, with reference to the appended drawings showing embodiments of the invention.

FIG. 6 illustrates a table for characteristics of output light from a LED module with and without engraving about 10% of the surface area according to the present invention.

FIG. 7 illustrates a table for characteristics of output light from a LED module with and without engraving about 100% of the surface area according to the present invention.

The figures are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein. Rather, these embodiments are provided for thoroughness and completeness, and fully convey the scope of the invention to the skilled person.

The following disclosure will refer to a lighting module in the form of a light emitting diode module comprising a light emitting diode (LED) as light source. It is understood that other types of lighting modules and light sources may be utilized as well within the scope of the appended claims.

Figure 1:
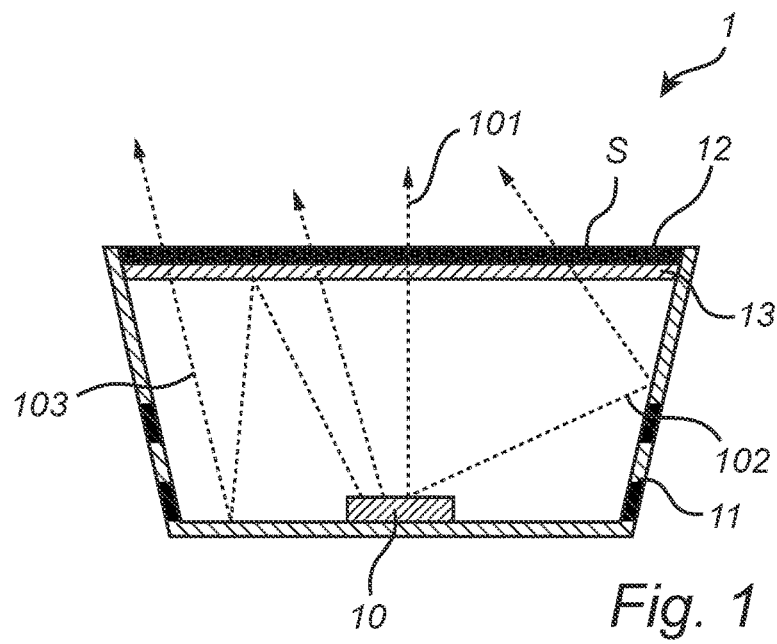
FIG. 1 illustrates a lighting module according to the present invention.

A cross-section of a lighting module 1 in form of an LED module is illustrated in FIG. 1, which is provided as an example of how a lighting module may be structured. It is realized that lighting modules of other structures, forms and shapes are possible within the scope of the appended claims.

The LED module of FIG. 1 comprises a light source 10 in the form of an LED chip arranged on the bottom of a housing 11. The housing 11 has an annular shape, thus providing a disc-shaped LED module. The inner wall of the housing 11 may be of, or be provided with, a reflective material for reflecting light provided by the light source 10. The housing 11 may be filled with a compound of e.g. a translucent resin.

The light source 10 may comprise one or more LEDs generating light of e.g. blue, red, green and/or ultraviolet (UV) wavelengths.

The lighting module 1 in form of the LED module further comprises a light exit window 12. The light exit window 12 has an outer surface S and an inner surface, wherein light generated by the light source 10 first enters the light exit window at the inner surface and then exits the light exit window via the outer surface S. The light exit window 12 may be made of a fully or partly transparent, translucent or fluorescent material. Non-limiting examples of feasible materials are a ceramic material, such as alumina, a glass material, or aluminum oxynitrid (AlON). In particular, the light exit window 12 may be a high thermal conductive alumina window. Alternatively, the light exit window 12 may be a ceramic phosphor, such as Yttrium Aluminum Garnet (YAG) or Lutetium Aluminum Garnet (LuAG) being similar to an alumina ceramic. Alternatively, the light exit window 12 may be made of a mineral based material such as sapphire (single crystal aluminumoxide) or Spinel. Alternatively, the light exit window 12 may be made of a polymer material such as PMMA. Alternatively, the light exit window 12 may be made of a fluorescent ceramic, such as Cerium doped Yttrium Aluminum Garnet (YAG:Ce) or Cerium doped Lutetium Aluminum Garnet (LuAG:Ce).

At the inner surface of the light exit window 12, a coating 13 is arranged. The coating 13 may be a phosphor coating. The coating 13 has the effect of converting wavelengths of light passing through the coating. The light may be converted into e.g. yellow, red or green. The coating 13 may be a mixture of different coating, e.g. a mixture of two or more phosphor coatings. The coating 13 may comprise a plurality of different coatings which are arranged in a layered structure. Different areas of the coating 13 may have different effects, e.g. a first area may be arranged to convert light into green, and a second area may be arranged to convert light into red.

The light source 10 is such that it provides output light having an optical path through the light exit window 12. By output light is meant the light that is provided by the lighting module 1, and in this case provided through the light exit window 12.

FIG. 1 illustrates examples of how the light provided by the light source 10 travels inside the lighting module 1. A first optical path 101 represents light which travels straight through the coating 13 and the light exit window 12. A second optical path 102 represents light which is reflected at an inner surface of the housing 11, and thereafter travels through the coating 13 and the light exit window 12. A third optical path 103 represents light which is reflected at the coating 13, and back towards an inner surface of the housing 11, where it is reflected and thereafter travels through the coating 13 and the light exit window 12.

In an alternative configuration of the lighting module 1, the light exit window 12 and/or the coating 13 may be arranged in direct contact to the light source 10. The light exit window 12 and the light source 10 are in such an embodiment preferably of a similar size. For example, a fluorescent coating or a phosphor layer may be glued to an upper portion of a LED chip forming the light source 10. Such a configuration is an example of a typical LED architecture. Another example of a feasible configuration is a light exit window 12 with a phosphor coating arranged at the inner surface of the light exit window 12, wherein the light exit window 12 is arranged at an upper portion of a LED forming the light source 1.

The characteristics of the output light from the lighting module 1, i.e. the light provided out from the light exit window 12, depends on the combination of light source 10 and coating 13. For example, a phosphor coating transforming light into yellow light may be used in combination with a light source generating blue light in order to provide white output light. The white output light is formed by a combination of blue light emitted from the LED chip and yellow light emitted from the phosphor coating, using some of the blue light as an excitation source.

It has now also surprisingly been realized, by the inventors, that other characteristics of the output light may also be modified by a modification of the light exit window 12. In particular, it has been realized that the color temperature of the output light, also referred to as output color temperature, may be tuned by engraving the light exit window 12.

The present invention is based on the principle that part of the light output from the light source 10 hits the engraved surface layer and partly scatters. Thus, part of this output light travels back into the lighting module.

In the present embodiment, a part of the blue light from the light source 10 hits the coating 13, at the coating 13, the backscattered light may be converted into another wavelength. In the case of a light source providing blue light, and a phosphor coating, backscattered blue light is converted in the phosphor layer into a higher wavelength, which leads to a warmer light color. When the converted light travels out from the lighting module and mixes with the rest of the output light, the overall output light will become warmer.

The engraving technique is not limited to any particular technique, however laser engraving is preferred. Other engraving techniques, such as chemical etching, electronic beam processing, mechanical engraving, blasting, and sand papering, are also feasible. The following disclosure will refer to laser engraving, but it is understood that other engraving techniques may be utilized as well.

The outer surface S of the light exit window 12 is engraved using a laser, for example a short pulsed solid state laser, such as a 1064 nm YAG laser. By engraving the outer surface S, the coating 13 on the inner surface of the light exit window 12 may be protected from being affected by the engraving and engraving process.

By engraving the outer surface S and/or inner surface of the light exit window 12, it has been realized that the color temperature of the output light is tuned. The extent of tuning depends on how much of the surface area is engraved. Thus, the engraving may be performed in a predetermined manner in order to achieve a predetermined tuning of the color temperature.

The engraving may be performed according to a pattern. The pattern may be a visual pattern. FIGS. 2a-2e illustrate different embodiments of the lighting module 1, where a visual pattern has been engraved. The FIGS. 2a-2e are views from above of the lighting module 1, i.e. the outer surface S faces the viewer. In these embodiments, the engraving is performed on the outer surface S. The engraved visual patterns are visible at least when the lighting module 1 is in its off state, i.e. when the lighting module 1 does not emit any light.

Figures 2A, 2B, 2C:
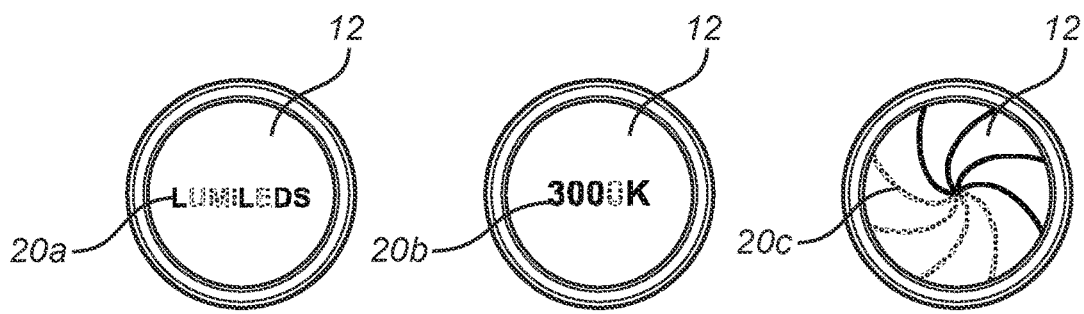
FIGS. 2a-2f illustrate different embodiments of lighting module exit windows.

FIGS. 2a and 2b illustrate how the informative text 20a, 20b may be incorporated by engraving.

Figures 2D, 2E, 2F:
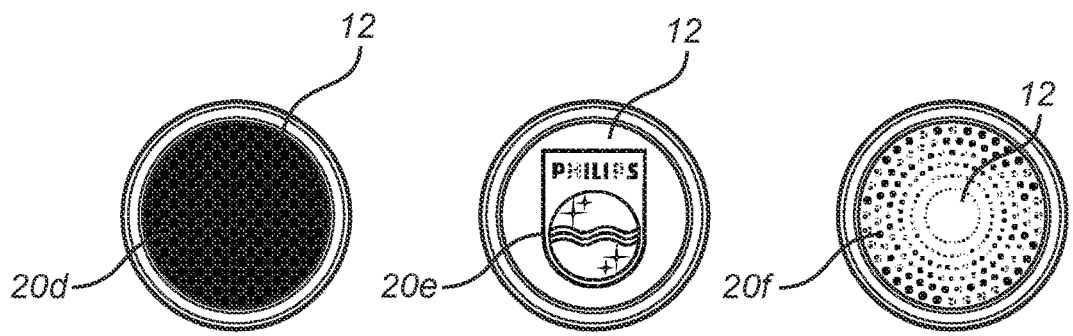

FIGS. 2c and 2d illustrate how a uniform pattern 20c, 20d may be incorporated by engraving.

FIG. 2e illustrates how a logotype 20e may be incorporated by engraving.

FIG. 2f illustrates how a non-uniform pattern 20f may be incorporated by engraving.

As illustrated, the pattern may be chosen very freely.

The engraving may be chosen based on the form of the coating 13. For example, if the coating 13 comprises a plurality of areas having different conversion characteristics, the engraving may have different tuning effect. Light is backscattered by the engraving to different areas of the coating 13 depending on the position of the engraving. Thus, the position of the engraving may be arranged based on the desired tuning effect.

Alternatively, or additionally, the position of the engraving may be chosen depending on the positions of the light source, in this case the LED chip 10. It has been shown that engraving at a position of the light exit window 12 corresponding to right above a LED in a LED chip 10 may have more impact on the tuning of color temperature than engraving at a position not corresponding to right above the LED, e.g. at a position corresponding to between two LEDs.

A first set of measurement runs have been performed, for studying how the characteristics of the output light are affected by engraving about 10% of the total area of the outer surface S of the light exit window 12. In the measurement runs, the optical performance of the LED module 1 without any engraving was measured with an integrating sphere. Thereafter, a logotype, covering about 10% surface area, was laser engraved on the outer surface S of the light exit window 12. Finally, the optical performance of the LED module 1 after laser engraving was measured again. The results of measurement runs are presented in FIG. 3 and FIG. 6.

Figure 3:
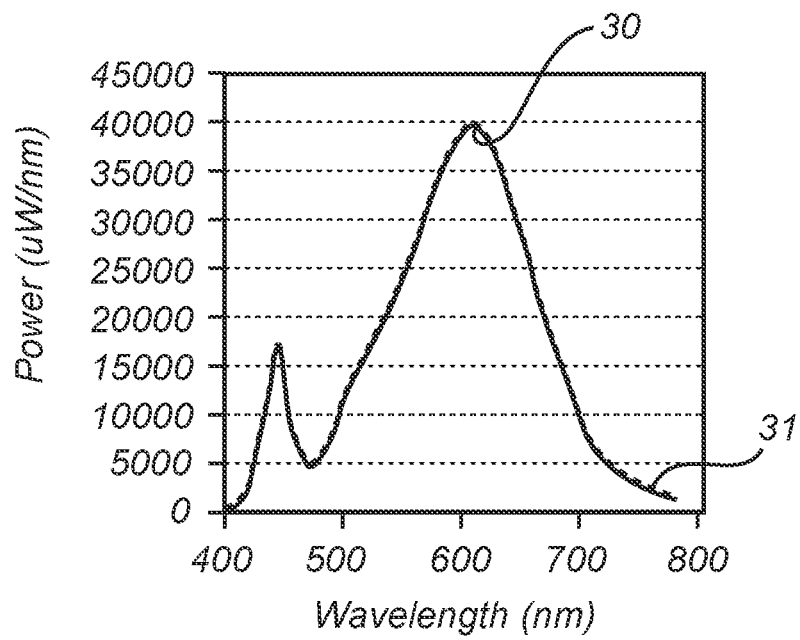
FIGS. 3 and 4 are diagrams of how light output is affected by engraving according to the present invention.

FIG. 3 shows the output power as a function of wavelength before and after engraving the light exit window 12. The solid curve 30 represents before laser engraving, and the dashed curve 31 represents after laser engraving. FIG. 6 illustrates a table for characteristics of output light from a LED module with and without engraving about 10% of the surface area according to the present invention.

From the measurement runs of the output power it can be concluded that the power of the output light increased slightly. In particular, it can be concluded that the engraving did not significantly or negatively affect the light output.

From the table in FIG. 6, it is clear that laser engraving of the light exit window 12 can be applied for tuning of the color temperature of the output light. With a 10% surface area laser engraving, as used in these measurements runs, the color temperature can be tuned down with around 20 K. The overall light output (power and lumens) is increased with about 1% according to the table in FIG. 6.

A second set of measurement runs have also been performed, for studying how the characteristics of the output light are affected by engraving 100% of the total surface area of the outer surface S of the light exit window 12. The measurement runs were performed in the same manner as the previous measurement runs, except in view of the extent of engraving. The results of measurement runs are presented in FIG. 4 and FIG. 7.

Figure 4:
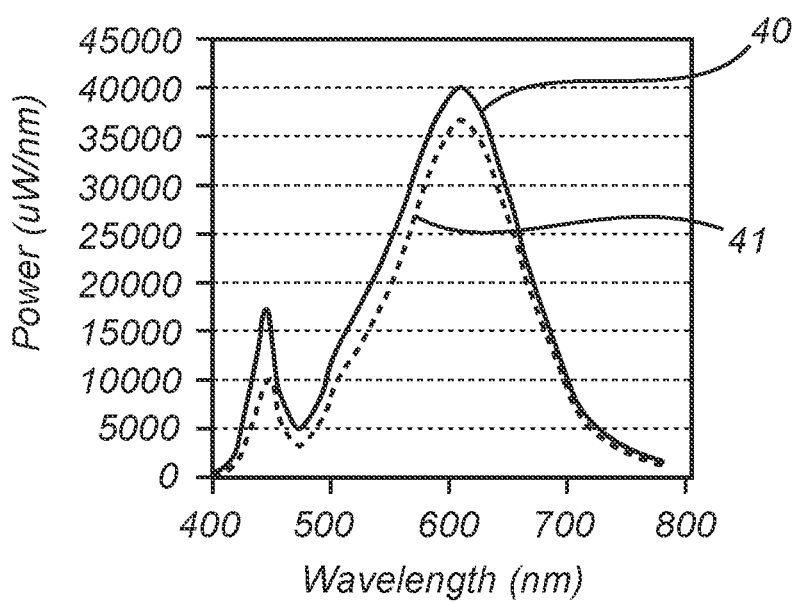

FIG. 4 shows the output power as a function of wavelength before and after engraving the light exit window 12. The solid curve 40 represents before laser engraving, and the dashed curve 41 represents after laser engraving. FIG. 7 illustrates a table for characteristics of output light from a LED module with and without engraving about 100% of the surface area according to the present invention.

From the table in FIG. 7, it is clear that laser engraving of the light exit window 12 can be applied for tuning of the color temperature of the output light. With a 100% surface area laser engraving, as used in these measurements runs, the color temperature can be tuned down with −270 K.

The result of the sets of measurement runs shows that the color temperature can be tuned downwards in the range of about 20 K to about 260 K. In relation to the total color temperature of the output light, which lies in the range of 2774 K and 2812 K in the sets of measurement runs, the tuning of color temperature is a fine tuning. The color temperature may be tuned 0.7-9.6% depending on how much of the surface that is engraved.

Figure 5:
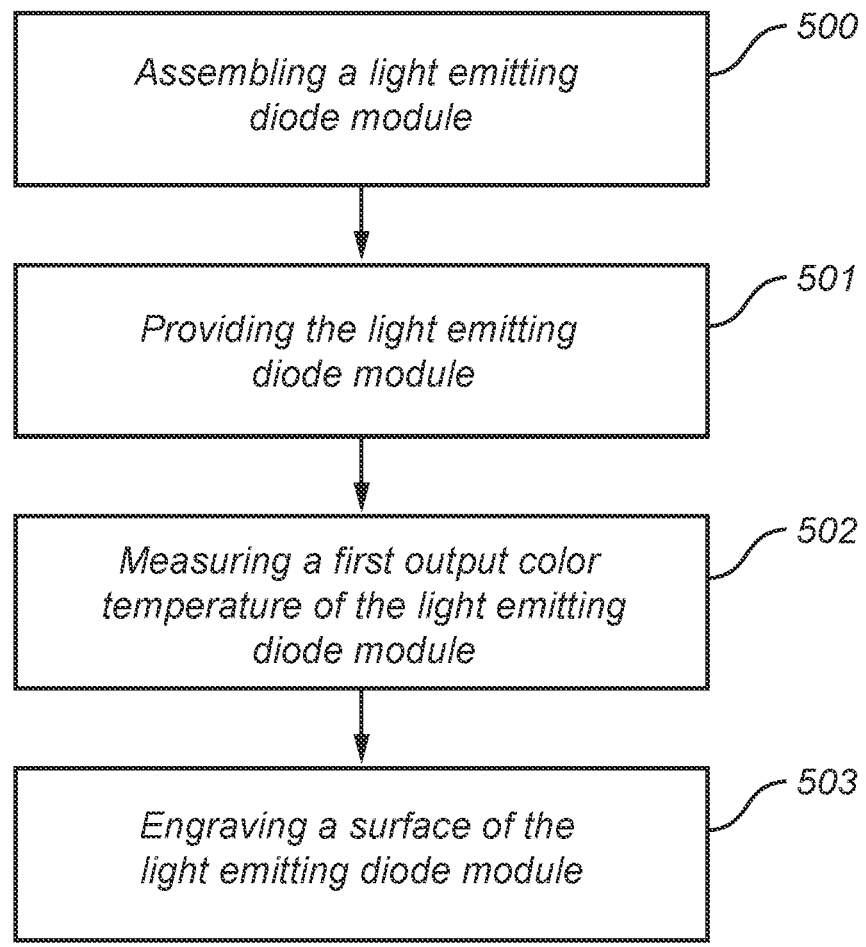
FIG. 5 illustrates a method for tuning an output color temperature of a light emitting diode module.

A corresponding method for tuning the output color temperature of the lighting module 1 is illustrated in FIG. 5. The method comprises the steps of firstly assembling 500 the lighting module 1, secondly providing 501 the lighting module 1, thirdly measuring 502 a first output color temperature of the lighting module 1, and fourthly engraving 503 a surface of the lighting module 1.

In accordance to the above results of the sets of measurement runs, the color temperature of the output light from the LED module 1 may be tuned downwards to a lower color temperature. The tuning of the output color temperature may also be affected by the intensity/roughness of the engraving. By utilizing a fixed intensity/roughness, the tuning of the output color temperature may be controlled by the amount of the surface area of the light exit window 12 that is engraved. In this case, the relation between the change in output color temperature and engraved area is expected to be linear.

In another embodiment the color temperature of the lighting module 1 is increased by controlling or tuning the amount of scatter or reflection, for example with a laser engraved pattern. In this case, the light exit window 12 has predefined scattering properties. For example, if the light exit window 12 is a ceramic layer, a modification of the porosity of the light exit window 12 provides for a modification of the scattering properties. An increase of the porosity of the light exit window 12 will lead to increased scattering, and this provides for an increase of light that is scattered back to the coating 13, being in this case a phosphor coating, resulting in a warmer color of the output light. A reduction of the amount of scattering will thus give a cooler color, i.e. a higher color temperature. Alternatively, the light exit window 12 may comprise a diffusing or partially reflecting layer (not shown) which may be applied on top of the light exit window 12. Removal of at least a part of this layer in a controlled way leads to an increase of the color temperature. For example, a scattering glass layer or a scattering polymer coating may be provided on the light exit window 12 which is laser engraved, in accordance to e.g. a pattern, which leads to an increase the color temperature.

By assembling the lighting module 1 before engraving of the light exit window 12, the lighting module 1 may be assembled at one location along a manufacturing line, and transported to another location for laser engraving. Since the lighting module 1 is already assembled, there is no risk for damaging any inner components of the lighting module 1 during the transportation.

By measuring a first output color temperature, the final second output color temperature of the lighting module may be tuned based on a predetermined value. For example, it may be determined that each lighting module in a batch of lighting modules is to be tuned to a target color temperature of 2750 K. Depending on how much the measured first output color temperature for each lighting modules differs from the target color temperature, the lighting module may need tuning to different extents. The tuned second color temperature may be measured in order to verify that it corresponds to the target color temperature.

The method may further comprise, subsequent to the engraving 503, measuring the output color temperature and compare the measured output color temperature with a predetermined target color temperature. If there is a difference between the measured output color temperature and the target color temperature, the method may comprise further steps of engraving and subsequent measuring of the output color temperature until the target color temperature is achieved.

The light exit window 12 is engraved according to the above disclosed description. By engraving the outer surface S of the light exit window 12, the lighting module 1 does not need to be de-assembled before the engraving process. A sub-surface of the light exit window 12, i.e. a layer within the light exit window 12, may alternatively or additionally be engraved without the need for de-assembling of the lighting module 1 before the engraving process.

In case a de-assembling of the lighting module 1 is prevented, any coating 13 arranged in the housing 11 may be protected from damaging during the engraving process.

The method may further comprise arranging (not shown) a cover to the lighting module 1. The cover is arranged adjacent to the outer surface S of the light exit window 12. By the cover, the outer surface S, optionally comprising an injection moulded pattern, may be protected from e.g. dust or physical damage. The cover may also be engraved. For example, a visual pattern may be engraved in the cover subsequent to arranging the cover to the lighting module 1.

The light exit window 12 may be injection moulded. Such a light exit window 12 may comprise an injection moulded pattern, such as a logotype. The injection moulded pattern may be negative or positive. The engraving of the light exit window 12 may be performed in the injection moulded pattern.

The range of applications for the present invention is wide. As disclosed herein, lighting modules with an alumina and optionally glass window is one application. These lighting modules can be proximity, vicinity as well as remote phosphor modules. Other optical applications being based on the same principle may also be included, i.e. optical applications where light may be backscattered at an engraving in the light exit window, and where the backscattered light may be converted in the lighting module, by e.g. a coating, to another wavelength, thus modifying the light characteristics, in particular the color temperature, of the output light of the lighting module.

In summary, the present invention relates to a method for tuning an output color temperature of a lighting module 1, said method comprising providing 501 said lighting module comprising a light exit window 12, and a light source 10 arranged to provide light having an optical path 101, 102, 103 through said light exit window 12, said lighting module having a first output color temperature; and engraving 503 a surface of said light exit window 12 such that the output color temperature of said lighting module is tuned to a second output color temperature. The present invention also relates to a lighting module 1, wherein a light exit window 12 of the lighting module is engraved such that the output color temperature of said lighting module is tuned.

The person skilled in the art realizes that the present invention by no means is limited to the preferred embodiments described above. On the contrary, many modifications and variations are possible within the scope of the appended claims. For example, the lighting module may be of many different shapes and structures, such as having multiple LED chips or other lighting sources or being in the form of an array of light sources and/or housings sharing the same light exit window. Further, the lighting module may be other types of lighting modules than LED modules, and may include other types of light sources. Non-limiting examples of other types of lighting modules are lighting bulbs, lighting tubes, and organic light emitting diode modules (OLED modules).

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A lighting module comprising:
   a light exit window having an inner surface and an outer surface;
   a phosphor coating arranged on the inner surface of the light exit window;
   a light source arranged to provide light having an optical path through the light exit window; and
   a cover arranged adjacent to an outer surface (S) of the light exit window;
   wherein the outer surface of said light exit window comprises an engraved pattern thereby increasing the amount of light backscattered to the phosphor coating.

2. The lighting module according to claim 1, wherein said lighting module is a light emitting diode module and wherein said light source is a light emitting diode.

3. The lighting module according to claim 1, wherein the light exit window comprises a material chosen from the group consisting of a glass material, a translucent polymer material such as PMMA, a ceramic material such as alumina, aluminum oxynitrid (AlON), a ceramic phosphor comprising one of Yttrium Aluminum Garnet (YAG) and Lutetium Aluminum Garnet (LuAG), a mineral based material such as sapphire or Spinel, and a fluorescent ceramic comprising one of Cerium doped Yttrium Aluminum Garnet (YAG:Ce) and Cerium doped Lutetium Aluminum Garnet (LuAG:Ce).

4. The lighting module according to claim 1, wherein a surface of said light exit window is engraved, to an extent of 10-100% of the surface area of said surface.

5. The lighting module according to claim 1, wherein the light exit window is engraved according to a visual pattern.

6. A method for tuning an output color temperature of a lighting module, said method comprising:
providing said lighting module comprising a light exit window and a phosphor coating arranged on an inner surface, in view of the optical path, of the light exit window, and a light source arranged to provide light having an optical path through said light exit window, said lighting module having a first output color temperature; and
engraving said light exit window thereby increasing the amount of light backscattered to the phosphor coating.

7. The method according to claim 6, wherein said second output color temperature is lower than said first output color temperature.

8. The method according to claim 6, wherein said second output color temperature is higher than said first output color temperature.

9. The method according to claim 6, wherein said engraving is performed by means of laser engraving.

10. The method according to claim 6, further comprising measuring the first output color temperature, and wherein said engraving is performed based on the measured first output color temperature.

11. The method according to claim 6, wherein said engraving is performed on a surface of said light exit window on a surface area in the range of 10-100% of said surface.

12. The method according to claim 6, wherein said engraving is performed such that a visual pattern is engraved.

13. The method according to claim 6, further comprising assembling said lighting module, wherein said assembling is performed before said engraving.

14. The lighting module according claim 1, wherein the light source is arranged on a bottom of a housing which housing has a reflective inner wall.

* * * * *